United States Patent
Baldwin et al.

(10) Patent No.: US 7,027,355 B2
(45) Date of Patent: Apr. 11, 2006

(54) ULTRASONIC DISPLACEMENT SENSOR USING DIGITAL SIGNAL PROCESSING DETECTION

(75) Inventors: John R. Baldwin, Bridgeport, CT (US); Martin D. Fox, Stores, CT (US)

(73) Assignee: Hubbell Incorporated, Orange, CT (US)

( * ) Notice: Subject to any disclaimer, the term of this patent is extended or adjusted under 35 U.S.C. 154(b) by 179 days.

(21) Appl. No.: 10/337,878

(22) Filed: Jan. 8, 2003

(65) Prior Publication Data

US 2004/0130969 A1    Jul. 8, 2004

(51) Int. Cl.
   *G01S 15/04*    (2006.01)
(52) U.S. Cl. .................................. 367/93; 340/552
(58) Field of Classification Search ................. 367/93, 367/94; 315/149, 159; 340/541, 566, 567, 340/825, 52, 552; 342/61
   See application file for complete search history.

(56) References Cited

U.S. PATENT DOCUMENTS

| | | | |
|---|---|---|---|
| 3,867,711 A * | 2/1975 | Ruscus ...................... 340/566 |
| 4,382,291 A | 5/1983 | Nakauchi ...................... 367/93 |
| 4,499,564 A * | 2/1985 | Sirai ............................ 367/93 |
| 4,512,000 A | 4/1985 | Masuko ........................ 367/93 |
| 4,551,654 A * | 11/1985 | Barnum ....................... 340/541 |
| 4,939,683 A | 7/1990 | van Heerden et al. ...... 708/212 |
| 5,349,524 A | 9/1994 | Daft et al. ............. 364/413.25 |
| 5,415,045 A | 5/1995 | Wadaka et al. ............... 73/602 |
| 5,612,928 A * | 3/1997 | Haley et al. ................. 367/131 |
| 5,675,320 A | 10/1997 | Cecic et al. ................. 340/566 |
| 5,729,193 A * | 3/1998 | Grasmann et al. ............ 367/93 |
| 5,781,460 A | 7/1998 | Nguyen et al. ....... 364/724.011 |
| 5,831,528 A | 11/1998 | Cecic et al. ................. 340/550 |
| 5,914,655 A | 6/1999 | Clifton et al. .............. 340/506 |
| 5,917,410 A | 6/1999 | Cecic et al. ................. 340/541 |

\* cited by examiner

*Primary Examiner*—Ian J. Lobo
(74) *Attorney, Agent, or Firm*—Stacey J. Longanecker; Mark S. Bicks; Alfared N. Goodman (57) ABSTRACT

An apparatus and method is provided for detecting motion or displacement of an object in a monitored zone. The apparatus is disposed between a load and a power source and comprises a transmitter for providing a pulsed signal within a monitored zone. The pulsed signal interacts with objects in the monitored zone and provides a return signal. A receiver receives echoes from a return signal of the pulsed record signal, and a microcontroller circuit processes the echoes. The processing involves extracting a kernel from the return signal and multiplying the kernel by the stored return signal.

20 Claims, 9 Drawing Sheets

ULTRASONIC DISPLACEMENT SENSOR USING DIGITAL SIGNAL PROCESSING DETECTION

CROSS REFERENCE TO RELATED APPLICATIONS

Related subject matter is disclosed in U.S. patent application Ser. No. 10/243,732 entitled "Ultrasonic Displacement Sensor Using Envelope Detection" filed on Sep. 16, 2002, the entire contents of said non-provisional application in its entirety being incorporated by reference.

FIELD OF THE INVENTION

The present invention relates generally to a method and system for controlling lighting fixtures in a room via a motion sensor. More particularly, the invention relates to the detection of displacement in a room using ultrasonic pulses and digital signal processing detection techniques to accurately detect displacement in favorable and unfavorable environments.

BACKGROUND OF THE INVENTION

Many commercial, industrial, and government facilities require a significant number of lighting fixtures for adequate illumination, and therefore use a significant amount of power to operate the fixtures. In an effort to reduce costs in powering the light fixtures, as well as address environmental conservation concerns, a number of lighting control systems are used which employ sensors to automatically and selectively power the light fixtures on and off. Such lighting control systems are especially useful to automatically power down lights used infrequently, and thereby minimize lights remaining on unnecessarily after users have vacated the area. Thus, lighting control systems can provide significant energy and cost savings.

Currently, different types of occupancy sensors such as passive infrared ("PIR") ultrasonic, microwave and acoustic sensors, for example, are used for lighting control systems. The PIR sensor activates lighting fixtures whenever a moving or additional heat source is detected. The ultrasonic sensor emits ultrasonic vibrations at frequencies of 25 kHz or higher and listens to the return of echoes. If a significant Doppler shift is detected, it indicates a high probability that there is movement in the room. The lighting fixtures are then activated in response to the detected movement. Based on a preset time interval, the light fixtures are activated to illuminate the room for a period of time that is typically between three and sixty minutes in duration. The motion sensitivity of the sensors is usually set by users upon the initial installation of the sensors.

PIR sensors, however, are characterized by a number of disadvantages. First, PIR sensors cannot detect motion behind barriers in a room. For instance, if a secretary is standing behind a file cabinet, the PIR sensor cannot detect motion occurring behind the file cabinet. Therefore, it may appear to the sensor that the secretary is no longer in the room, and the lights will be powered off once the preset time period for illumination has expired.

Secondly, PIR sensors are susceptible to "dead spots" which are areas in the room where the PIR sensors are less sensitive to heat sources. The dead spots usually occur in areas that have obstructions or at the fringes of the range of the PIR sensor.

Ultrasonic sensors suffer from the following disadvantages. Firstly, ultrasonic sensors are subject to false tripping where the lights can be powered based on false readings. The cause of false tripping is usually heating and air conditioning units moving air flow. The change in air temperature effects the return echoes by introducing phase and amplitude changes which, in turn, changes the arrival time of the echoes. Since the echoes do not arrive when expected, the ultrasonic sensors assume that movement has been detected in the room.

Secondly, ultrasonic sensors typically use continuous wave ultrasonic signals. Ultrasonic sensors using continuous wave signals respond to any detected motion in a room. There is no discrimination between a small object close to the ultrasonic sensor and a larger object that is further away. In other words, there is no range discrimination using continuous wave ultrasonic signals.

Thirdly, ultrasonic sensors do not perform as well in noisy environments. The noise can give false readings, causing the lights to power off at an inappropriate time.

Fourthly, conventional ultrasonic sensors draw a lot of current due to transmitting a continuous signal. It would be preferable to transmit a different type of signal from an ultrasonic sensor and draw as little current as necessary.

Therefore, a need exists for an occupancy sensor that can detect objects behind obstacles in a room. The occupancy sensor should also be able to address dead spots in a room. In addition, the occupancy sensor should also be able to address the problems associated with the effects of heating and air conditioning on airflow. Further, the occupancy sensor should be able to operate in noisy environments, as well as draw minimal current.

SUMMARY OF THE INVENTION

The above and other objectives are substantially achieved by an apparatus and method employing a circuit for detecting motion within a monitored zone.

The apparatus is disposed between a load and a power source and comprises a transmitter for providing a pulsed signal within a monitored zone. The pulsed signal interacts with objects in the monitored zone and provides a return signal. A receiver receives echoes from a return signal of the pulsed record signal, and a microcontroller circuit processes the echoes. The processing involves extracting a kernel from the return signal and multiplying the kernel by the stored return signal.

In accordance with an embodiment of the present invention, the microcontroller stores successive return signals in memory with previously stored return signals.

In accordance with another embodiment of the present invention, the microcontroller stores fixed intervals of non-contiguous sample points for at least one of the kernel and the return signal.

In accordance with still another embodiment of the present invention, the kernel is reversed in orientation.

BRIEF DESCRIPTION OF THE DRAWINGS

The details of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

Figure 1:
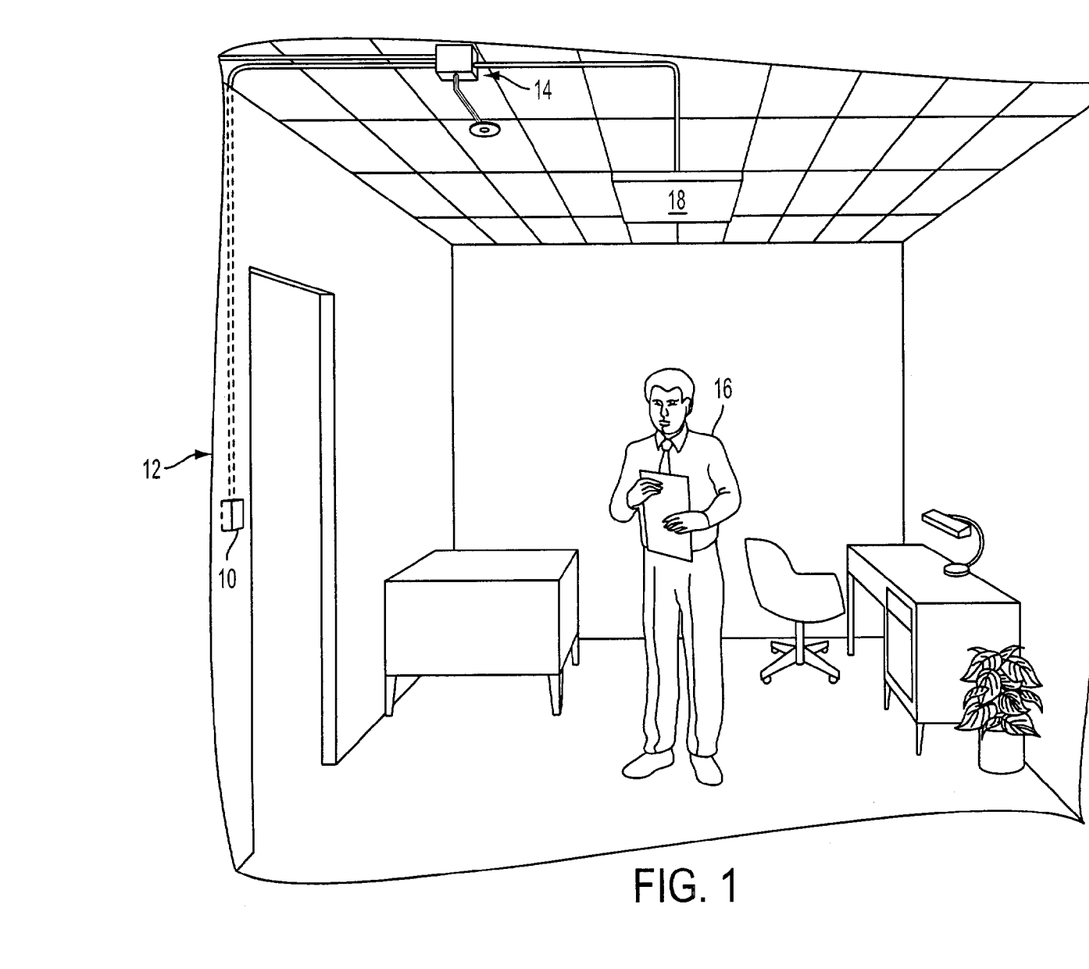
FIG. 1 illustrates a lighting control system mounted on a wall for controlling suspended lighting fixtures, and constructed in accordance with an embodiment of the present invention.

A switching control system 10 constructed in accordance with the present invention is shown in FIG. 1. The switching control system 10 is implemented with lighting fixtures for illustrative purposes and is therefore hereinafter referred to as a lighting control system 10. The control system, however, can be used with a number of different types of loads such as heating ventilation and air conditioning ("HVAC"), security and temperature control systems. The lighting control system 10 is secured to a wall 12 preferably 41 to 53 inches vertically from the floor. The height is selected to enable the motion sensor (not shown) in the lighting control system to detect when an occupant 16 is walking in proximity of the sensor. However, it will be appreciated by those skilled in the art that the lighting control system 10 can be ceiling mounted without departing from the scope of the present invention. As will be described below, the lighting control system 10 controls the powering up and down of lighting fixtures 14 which are typically mounted overhead to a ceiling 18.

While the lighting control system 10 is shown in FIG. 1 secured to a wall in a room with ceiling mounted lighting fixtures, the system 10 can be installed in indoor areas, for use with or without overhead lighting fixtures, (e.g., floor lamps can be used). Furthermore, lighting control system 10 can be mounted on various surfaces such as the ceiling or on a vertical support or an angled wedge and at various heights to detect, for example, persons sitting in or walking about the "lighted area". The term "lighted area" defines the area served by the lighting fixtures 14 controlled by a lighting control system 10, and does not necessarily imply that the fixtures 14 are powered up.

Figure 2:
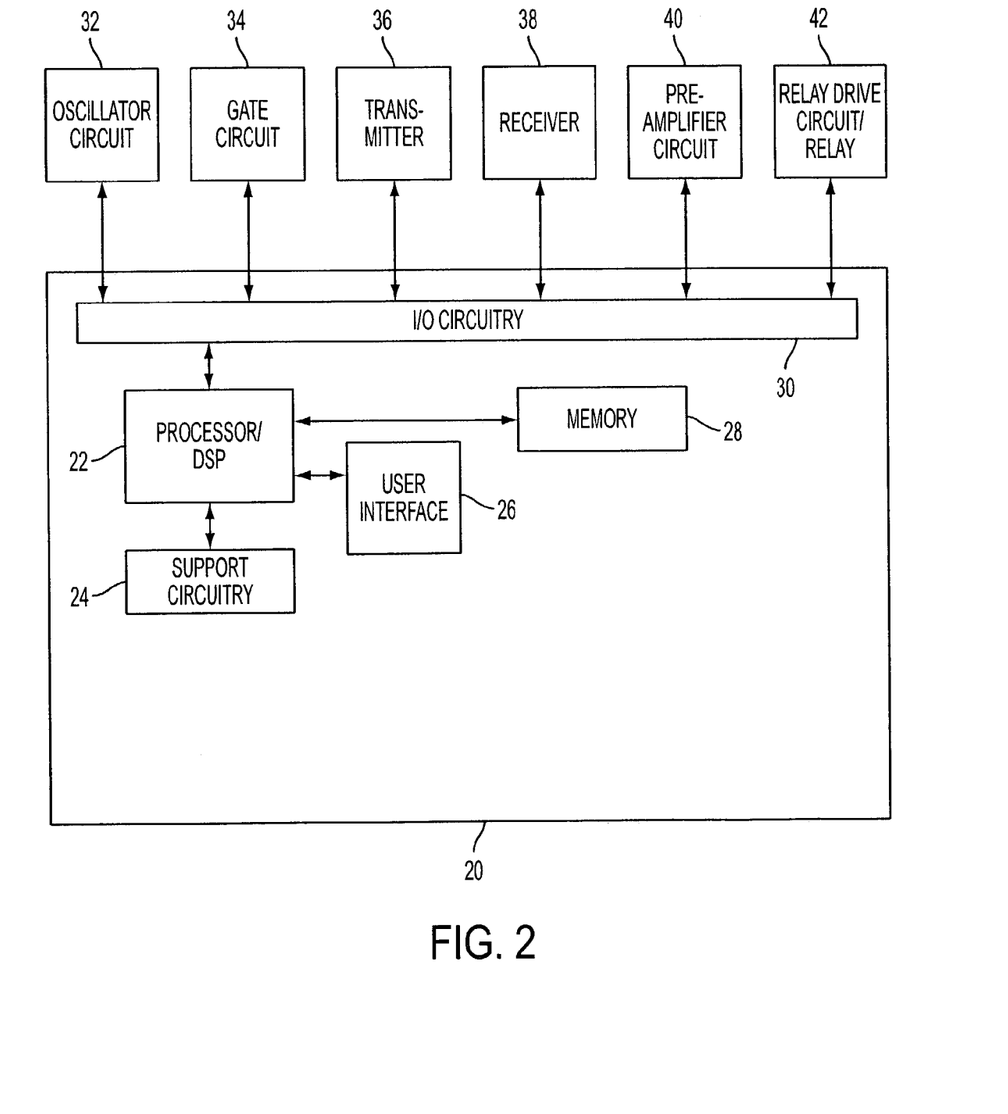
FIG. 2 shows a digital signal processing circuit for determining displacement of an object in accordance with an embodiment of the present invention.

The lighting control system 10 will now be discussed with reference to FIG. 2 which is a block diagram of a microcontroller 20 used to determine displacement of an object by the lighting control system 10 of FIG. 1 in accordance with an embodiment of the present invention. Specifically, the microcontroller 20 comprises a microprocessor/Digital Signal Processor(DSP) 22, as well as memory 28 for storing programs for performing various correlation functions. The microprocessor/DSP 22 cooperates with conventional support circuitry 24 such as power supplies, clock circuits, analog to digital (A/D) and digital to analog (D/A) conversion circuitry, filtering circuits such as high pass, low pass and the like, as well as circuits that assist in executing the correlation functions of the present invention. A user interface device 26 such as a sensitivity adjuster is provided to adjust the sensitivity of the lighting control system 10. In accordance with an embodiment of the invention, the sensitivity adjuster can comprise, but is not limited to, a potentiometer, a dip switch and a key pad.

The microcontroller 20 also comprises input/output circuitry 30 that forms an interface between the microprocessor 22, an oscillator circuit 32, a gate circuit 34, a transmitter 36, a receiver 38, a pre-amplifier circuit 40, and a relay drive circuit and relay 42. It should be appreciated by those skilled in the art that the functionality of the oscillator circuit 32, gate circuit 34, pre-amplifier circuit 40 and relay drive circuit 42 can be performed by the microcontroller 20 without departing from the scope of the present invention.

The input/output circuitry 30 can interface with the lighting fixtures 14 via the relay drive circuit and relay 42 such that the lighting fixtures can be powered on when displacement is detected. The lights will remain on as long as the displaced object or person remains in the room or movement of the displaced object or person is detected within a predetermined time interval.

Although the microcontroller 20 is depicted as a general purpose computer that is programmed to perform, in general, the digital signaling processing functions of the lighting control system 10, the invention can be implemented in hardware, in software, or present a combination of hardware and software. As such, the digital signaling processing functions described above with respect to the various figures are intended to be broadly interpreted as being equivalently performed by software, hardware, or a combination thereof.

The operation of lighting control system 10 will now be discussed with reference to FIG. 2. The oscillator circuit 32 of FIG. 2 preferably provides a 32.8 kHz signal, which is gated by the gating circuit 34 to provide a 32.8 kHz, 1.5 ms burst that occurs preferably about every 60 ms. The transmitter transducer 36 is a conventional transducer such as a model 33T-16B manufactured by Ceramic Transducer Design Co., LTD of Taiwan.

Initially, the first few transmit bursts are used to estimate the room size and determine the position of objects that are presently in the room. The return echoes are then received by receive transducer 38, which is a conventional transducer such as a model 33R-16B manufactured by Ceramic Transducer Design Co., LTD of Taiwan. Pre-amplifier circuit 40 amplifies the received echo for processing by the microcontroller 22.

In an embodiment of the present invention, the return echoes are processed using correlation for displacement detection. Correlation is a mathematical method of combining two input signals to form a third signal. If the two input signals are different, the third signal is considered the cross correlation of the two signals. However, if the two input signals are the same, the third signal is considered the auto-correlation of the two input signals. Combining the two input signals improves the signal-to-noise ratio. When detecting a known waveform in random white noise, correlation is one of the best means of detecting the peak waveforms of the input signal compared to using other linear systems to detect signal peak signals. For example, when a signal burst is transmitted from transmitter transducer 36, the echoes that are detected and received by receiver transducer 38 are a time shifted and amplitude scaled version of the transmitted signal burst. Included in the received echoes is random noise from various sources in the room. Random noise is a part of every conventional displacement detection system and poses a problem because the signal can be buried in the noise. Thus, it is essential that the signal be detected, e.g., distinguished from noise, to accurately determine whether displacement has occurred in the room.

Basically, correlation is a mathematical operation where each value in the output is expressed as the sum of values in the input, multiplied by a set of weighting coefficients. Correlation is mathematically equivalent to multiplying the complex conjugate of the frequency spectrum of one signal by the frequency spectrum of the same or a different signal and then inverse transforming, e.g., cross correlation is performed in the Fourier domain. For example, when a 32.8 kHz burst, 1.5 ms in duration is transmitted in about 60 ms intervals, the total echoes returning between transmissions comprises a record. A kernel, which is a section of data for a series of samples, is extracted from an echo and stored in memory 28. The kernel is multiplied by the record resulting in the following equation:

$$y[n] = \text{Correlate}\{\text{filter impulse kernel}\}\{\text{signal list}\}$$
$$= \text{Correlate}\{a_0, a_1\}, \{x_0, x_1, x_2, x_3, x_4\}$$
$$y[0] = a_0 x_0 + a_1 x_1$$
$$y[1] = a_0 x_1 + a_1 x_2$$
$$y[2] = a_0 x_2 + a_1 x_3$$
$$y[3] = a_0 x_3 + a_1 x_4$$
$$y[4] = a_0 x_3 + a_1 x_0$$

where the finite impulse response is the kernel and the signal list is the record. In this embodiment of the invention, the equation was stopped at the endpoint aixo rather than being circular and continuing. Substituting values for the kernel and record provides the following equation:

$$y[n] = \text{Correlation of } \{\text{finite impulse response kernel}\},$$
$$\{\text{signal sample list}\}$$
$$= \text{Correlation of } \{t, u, v, w, x, y, z\}, \{a, b, c, d, e, f, g, h, i, j, k\}$$
$$y[0] = at + bu + cv + dw + ex + fy + gz,$$
$$y[1] = bt + cu + dv + ew + fx + gy + hz,$$
$$y[2] = ct + du + ev + fw + gx + hy + iz,$$
$$y[3] = dt + eu + fv + gw + hx + iy + jz,$$
$$y[4] = et + fu + gv + hw + ix + jy + kz,$$
$$y[5] = ft + gu + hv + iw + jx + ky + \underline{az},$$

-continued
$$y[6] = gt + hu + iv + jw + kx + \underline{ay} + \underline{bz},$$
$$y[7] = ht + iu + jv + kw + \underline{ax} + \underline{by} + \underline{cz},$$
$$y[8] = it + ju + kv + \underline{aw} + \underline{bx} + \underline{cy} + \underline{dz},$$
$$y[9] = jt + ku + \underline{av} + \underline{bw} + cx + \underline{dy} + \underline{ez},$$
$$y[10] = kt + \underline{au} + \underline{bv} + \underline{cw} + \underline{dx} + \underline{ey} + \underline{fz},$$

The equation results in one summation of terms for each sample in the list. Each summation includes a multiplication for each sample in the kernel. In addition, the number of multiplications equals the number of kernel samples times the number of list samples, where a list sample is part of a record. When the kernel samples are multiplied by the record, an overlay occurs at the end of some of the equations. The overlays, which are represented by the underlined terms, can be depicted as zeros, blanks or underlined terms. It will be appreciated by those skilled in the art that the underlined terms may or may not be used in different embodiments of the invention and are used simply to provide a term and do not contribute anything to the equation.

In another embodiment of the present invention, correlation is performed using a thinning function. Thinning can be used to reduce the computational complexity, time and memory requirements for processing the correlated information for the microcontroller 20. Rather than storing data for every sample point, a fixed number of non-contigous sample points are stored. The sample points can preferably be processed at fixed intervals. For example, if there are 10,000 sample points, every $5^{th}$ sample point can be stored. This reduces the computational complexity, time and memory requirements of having to process and store every sample point.

In another embodiment of the present invention, correlation is performed using a smoothing function. Smoothing involves adding newly received records to the previously stored records in memory. Correlation is performed using the old records and the newly stored records. This provides a filtering function.

In still another embodiment of the present invention, convolution is used to process the record and kernel rather than correlation. Convolution and correlation are similar in theory except that a signal reversal occurs with convolution, i.e., the kernel used in convolution is flipped left to right. Also, convolution and correlation represent different digital signal processing procedures. For example, correlation represents a means of detecting a known waveform in a noisy environment. However, convolution represents the relationship between a system's input signal, output signal and impulse response, that is, convolution is a weighted moving average with one signal flipped from the right to the left. Both correlation and convolution require a large amount of calculations. For both, if one signal has a length M and the other signal has a length N, then N times M multiplications are required to calculate the complete convolution and correlation.

In essence, convolution is equivalent to multiplying the frequency spectra of two signals together, which is digital filtering. An equation for convolution is represented by the following:

$$y[n] = \text{Convolution of \{filter impulse kernel\}, \{signal list\}}$$
$$= \text{Convolution of } \{a_n, a_{n-1}, a_{n-2}, a_{n-n}\}, \{X_0, X_1, X_2, \ldots X_n\}$$
$$= a_n x_0 + a_{n-1} x_1 + a_{n-2} x_2 + \ldots + a_n x_n$$

where each individual value of y[n] is a summation of "n" multiplications and "n" additions, and each individual signal sample is multiplied by all the samples in the kernel.

$$y[n] = \text{Convolution of \{filter impulse kernel\}\{signal list\}}$$
$$= \text{Convolution of } \{a_1, a_0\}, \{x_4, x_3, x_2, x_1, x_0\}$$
$$y[0] = a_1 x_0 + a_0 x_1$$
$$y[1] = a_1 x_1 + a_0 x_2$$
$$y[2] = a_1 x_2 + a_0 x_3$$
$$y[3] = a_1 x_3 + a_0 x_4$$

It should be noted that the vertical columns of x, i.e., first column of $x_1$ to $x_4$ and second column of $x_0$ to $x_3$ are reversed when compared to the same columns for correlation.

Figure 3:
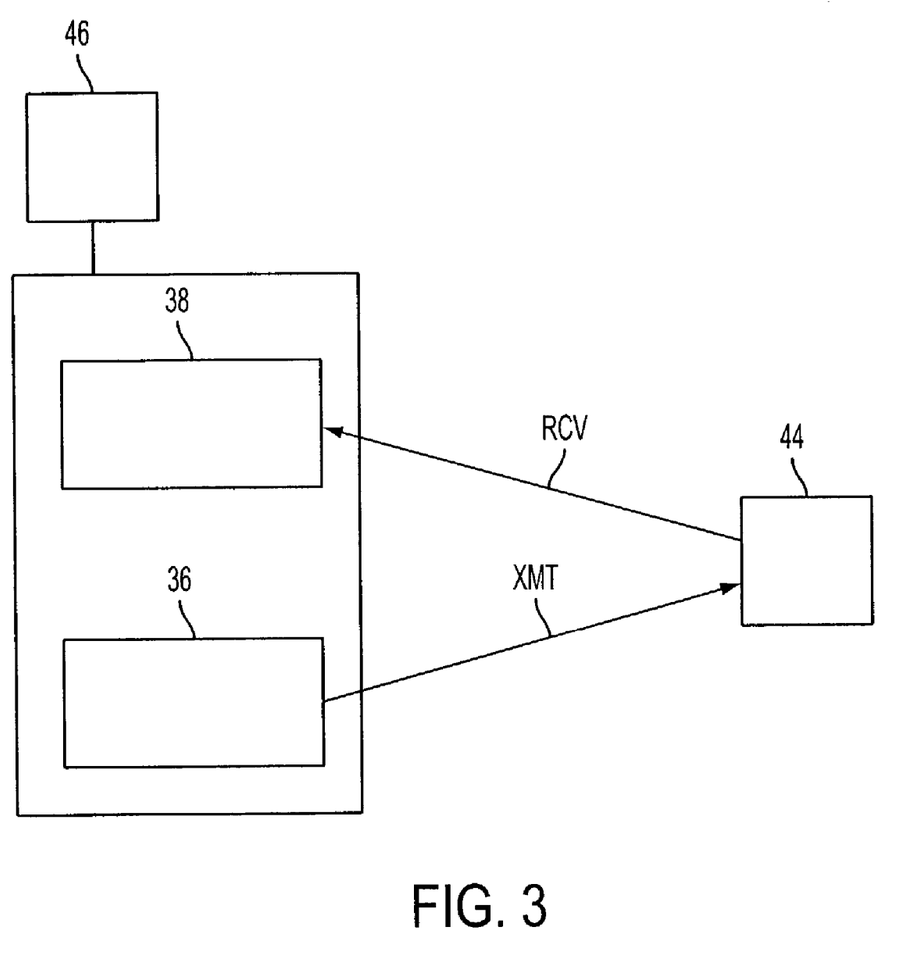
FIG. 3 shows a digital signaling circuit and arrangement for determining the displacement of an object for the lighting control system of FIG. 1 in accordance with an embodiment of the present invention.

The invention will now be discussed with reference to FIGS. 3 through 7D. FIG. 3 shows an experimental setup for performing correlation and convolution in accordance with an embodiment of the present invention and comprises the transmitter transducer 36, the receiver transducer 38, an object 44 and an oscilloscope 46. The object 44 is comprised of four arms covered with cloth like material. In addition, each arm of the object 44 is about fifteen inches in length. The object 44 is located about ten feet from the transducers 36 and 38. Oscilloscope 46 provides a view of the transmitted and received signals provided by the transmitter transducer 36 and receiver transducer 38 in the form of waveforms as shown in FIGS. 4A through 8D.

Figure 4A:
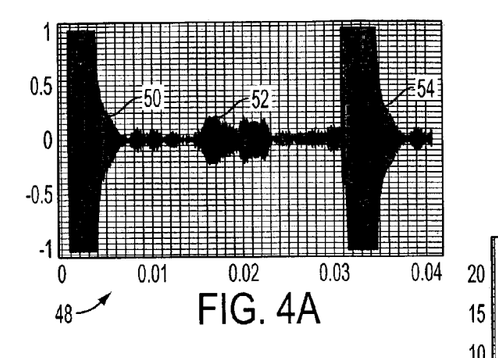
FIGS. 4A through 4G are graphs illustrating transmit signals in accordance with an embodiment of the present invention.
Figure 4B:
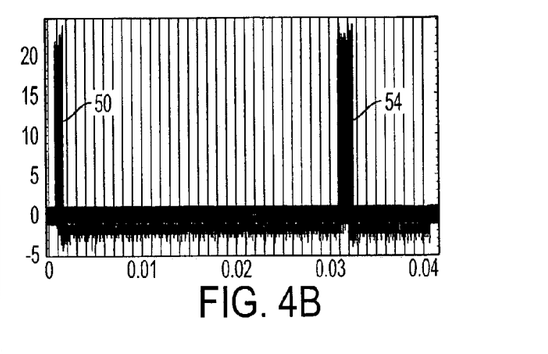
Figure 4C:
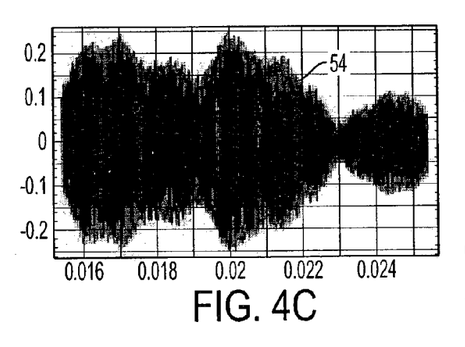

FIGS. 4A through 4I are graphs illustrating transmit and cross correlated receive signals that are subsequently processed in accordance with an embodiment of the present invention. Specifically, FIG. 4A depicts a received waveform 48 containing a first pulse 50, a record 52 and a second pulse 54. The waveform 48 is a full repetition period and comprises 10,000 samples over 30 ms. FIG. 4B provides a view of first and second transmit pulses 50 and 54 depicted as 1.5 ms bursts. An enlarged view of a portion of the record 52 is shown in FIG. 4C. The portion of the record 52 shown comprises a plurality of echoes from the object 44 occurring over a 10 ms period that is from about 15.5 to 25.5 ms.

Figure 4D:
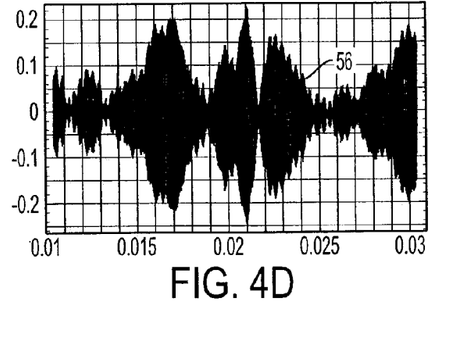
Figure 4E:
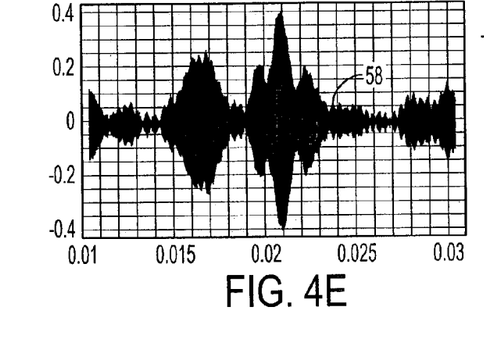

FIG. 4D is a graph of a portion of a record 56 for the object 44 adjusted to provide a small receive signal. The 10,000 samples signal was received over 20 ms that is from 10.5 to 30.5 ms. The vertical sensitivity of the oscilloscope was increased to view the signal clearly. In contrast, FIG. 4E is a graph of a portion of a record 58 with the object 44 adjusted to provide a large return signal. The object 44 was about 10 feet from the transmit transducer 36 and receive transducer 38. Using a 20 ft round trip and applying 1120 ft/sec for the speed of sound, the transmitted signal takes about 17.7 ms to be received as echoes. If the round trip was 23.5 ft and was divided by the speed of sound, the received echoes would arrive in about 21 ms. The difference between FIGS. 4D and 4E reflect a change in the record due to a change in the environment. For example, the distance between the object 44 and the transmit transducer 36 and receive transducer 38 can be adjusted and/or the angle at which the transmit pulse encounters the object 44 can be changed.

Figure 4F:
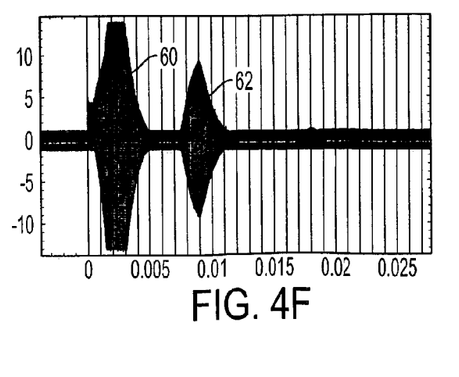

FIG. 4F shows a graph for a transmitted pulse 60 and a record 62 from a large object at a short range. The record 62 was reflected from an object 44 comprised of aluminum. The signals comprised 30,000 samples over a 30 ms duration. This experiment shows that as the transmit pulse encounters different objects in the room, the echoes will be received at different times at the receive transducer 38.

Figure 4G:
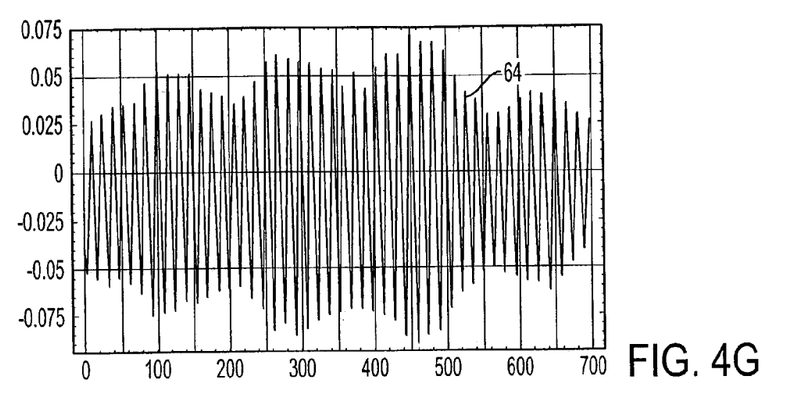

FIG. 4G is a graph of a kernel 64 from record 58 of FIG. 4E. Kernel 64 is used to de-correlate the record 56 of FIG. 4D and the record 58 of FIG. 4E. To calculate the round trip time for the kernel 64 to be received by the receive transducer 38, the following calculations are obtained:

$$700/10000(20)+10.5=11.9 \text{ ms}$$

$$1400/10000(20)+10.5=13.3 \text{ ms}$$

where 700 and 1400 represent the sample point, 10000 represents the total samples, 20 represents the round trip delay, and 10.5 represents the time period to receive the samples. In the present embodiment of the invention, the kernel is cross correlated with the data record (e.g., echoes plus noise). When a sequence within the data record is similar to the kernel and properly lined up, the cross correlation function is large. Thus, local peaks in a waveform correspond to echoes in the range of the system 10. In the present example, since there was only one major echo, cross corelation was performed once.

Figure 4H:
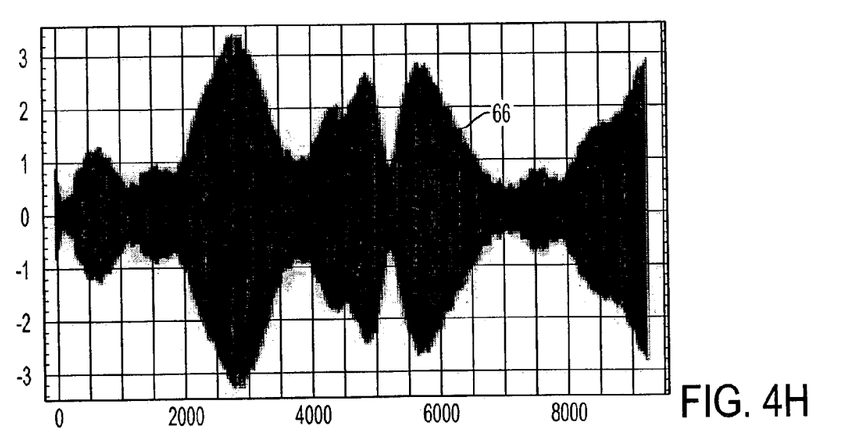
FIGS. 4H through 4I are graphs illustrating cross correlated signals in accordance with an embodiment of the present invention.
Figure 4I:
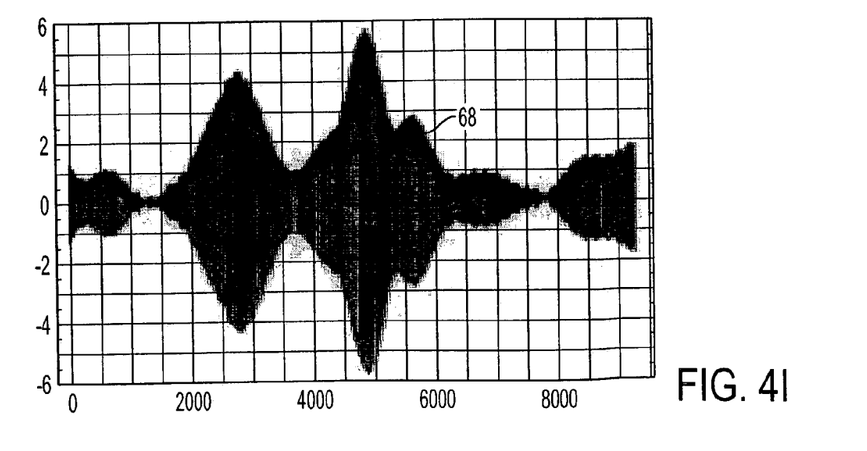

FIG. 4H shows a waveform for a decorrelated signal 66 that is the result of the decorrelation of the record 56 of FIG. 4D using the kernel 64. The waveform 66 is an improved signal compared to the record 56, that is, the decorrelated signal 66 is larger than the record 56 which was difficult to detect or the kernel 64. Similarly, FIG. 4I depicts a waveform for a decorrelated signal 68 that is the result of the decorrelation of the record 58 using the kernel 64. Again, the decorrelated signal 66 is a larger signal than both the record 58 or the kernel 64.

Figure 5A:
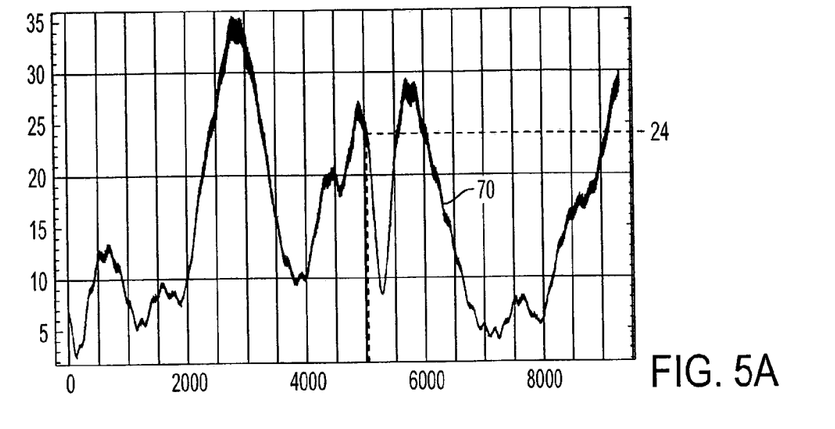
FIGS. 5A and 5C are graphs illustrating cross correlated receive signals that are processed using subtraction processing in accordance with an embodiment of the present invention.
Figure 5B:
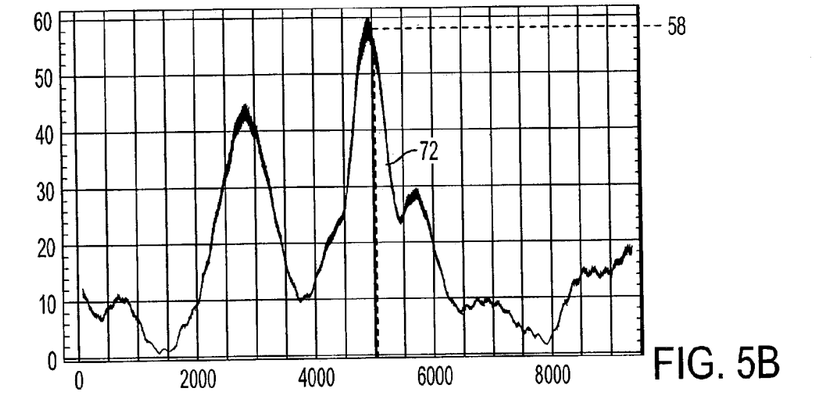
Figure 5C:
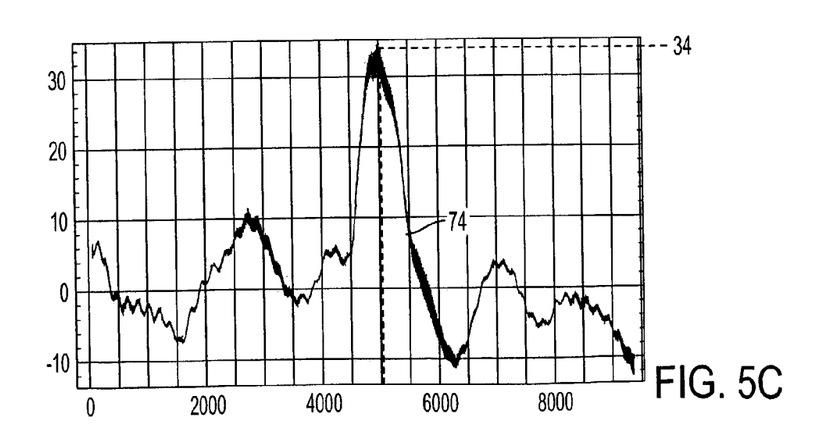

FIGS. 5A through 5C are graphs illustrating cross correlated receive signals that are processed using absolute value processing in accordance with an embodiment of the present invention. As discussed previously, the correlation circuit 20 stores the significant peaks from the echoes. Specifically, the significant peaks from the records are stored. For example, in FIG. 5A a waveform 70 comprising stored signal peaks is shown. Waveform 70 represents the receive signals when the object 44 was adjusted to provide a minimum return signal. At the 5,000$^{th}$ sample, there is a peak of about 24. FIG. 5B shows a waveform 72 comprising stored peaks when the object 44 is adjusted to provide a maximum return signal. At the 5,000$^{th}$ sample the peak of the waveform 72 is about 58. Subtracting the peaks at the 5,000$^{th}$ sample for the waveforms 70 and 72 provides waveform 74 of FIG. 5C which has a maximum peak of 34 at the 5,000$^{th}$ sample and can be calculated from 58−24=34.

Figure 6A:
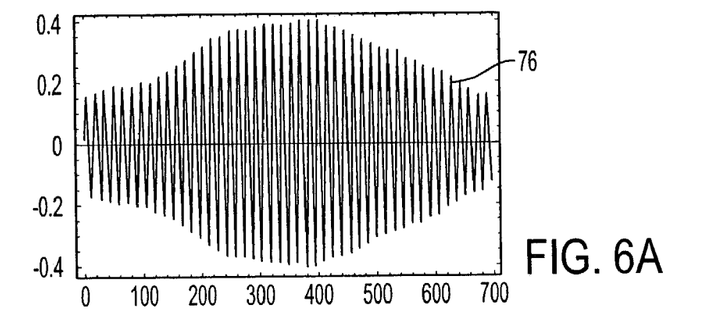
FIGS. 6A and 6B are graphs illustrating cross correlated non-hard limited and hard limited receive signals that are processed in accordance with an embodiment of the present invention.
Figure 6B:
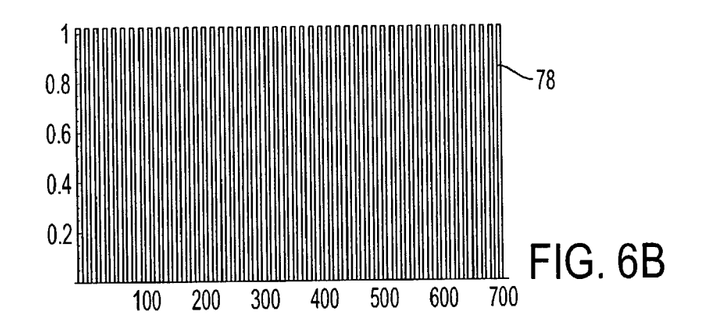

FIGS. 6A and 6B are graphs illustrating non-hard limited and hard limited receive signals that are processed in accordance with an embodiment of the present invention. Hard limiting simplifies the process of correlation by converting the signal into zeros and ones. Thus, the analog sequence is converted into zeros and ones. In hard limiting, the signal is amplified so that it saturates. The zero-crossings, as opposed to amplitude information, is then examined. The kernel 76 is hard limited and provides waveform 78 in FIG. 6B. Specifically, FIG. 6B shows waveform 78 which is hard limited into a zero and one sequence.

Figure 7A:
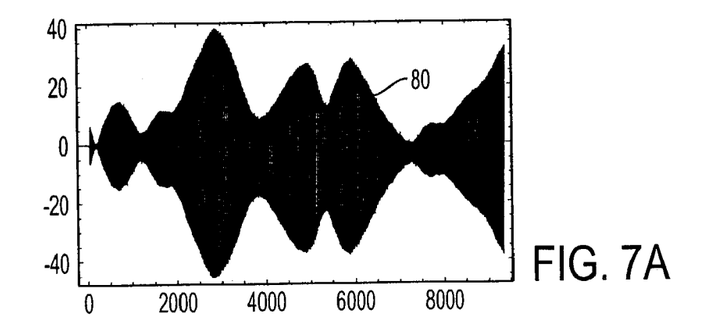
FIGS. 7A and 7B are graphs illustrating transmit and cross correlated receive signals processed in accordance with an embodiment of the present invention.
Figure 7B:
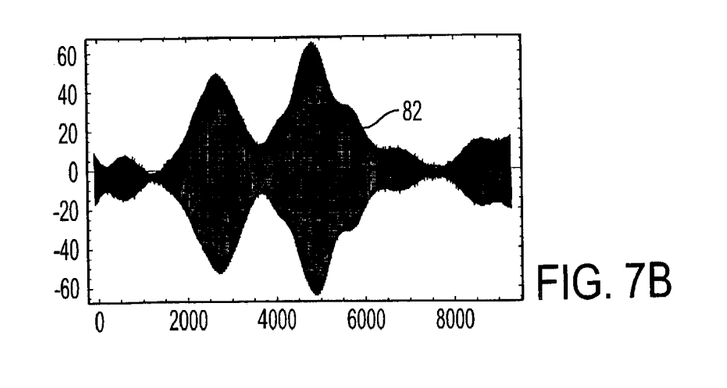

FIGS. 7A and 7B are graphs illustrating transmit and convolved receive signals processed in accordance with an embodiment of the present invention. In an embodiment of the invention, convolution can be used to process the return signals. Waveforms 80 and 82 each comprise signals cross-correlated with a hard limited kernel and receive signals. Waveform 80 represents the decorrelation of record 56 with hard limiting. Waveform 82 represents the decorrelation of record 58 with hard limiting.

Figure 8A:
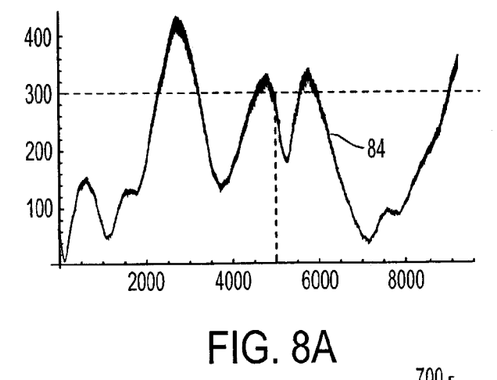
FIGS. 8A through 8D are graphs illustrating cross correlated receive signals that are processed using subtraction and absolute value processing in accordance with an embodiment of the present invention.
Figure 8B:
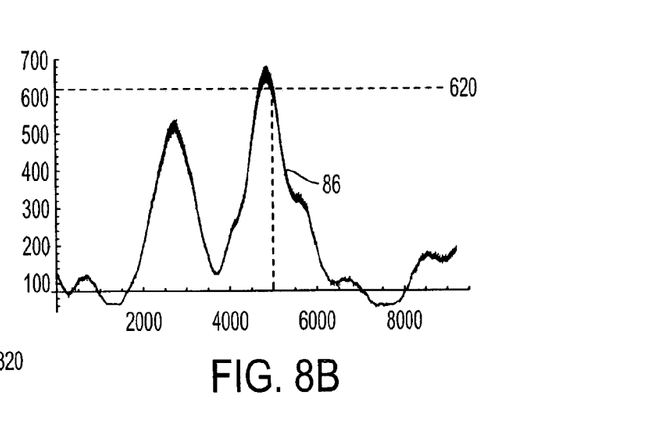
Figure 8C:
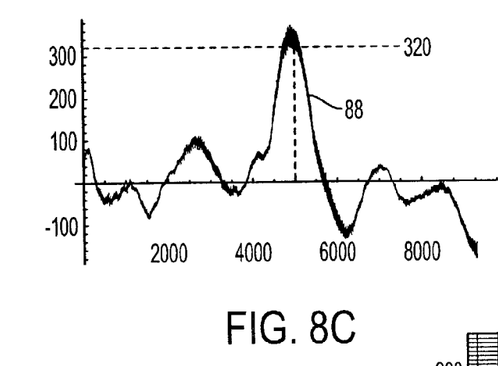
Figure 8D:
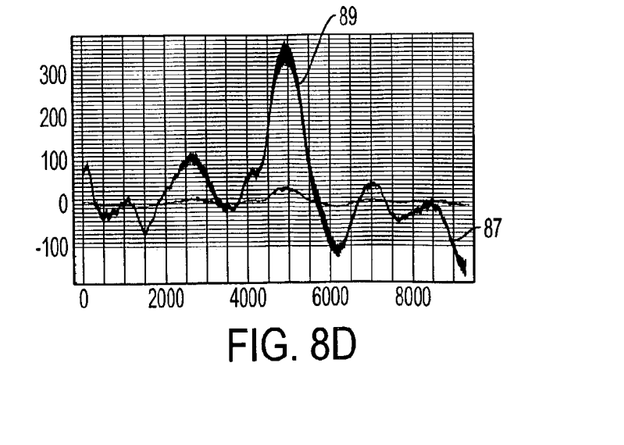

FIGS. 8A through 8D are graphs illustrating convolved receive signals that are processed using subtraction in accordance with an embodiment of the present invention. Waveform 84 represents a cross correlated, absolute value hard limited kernel 56. At about 5,000 samples waveform 84 has a peak of about 300. Waveform 86 represents a cross correlated, absolute value hard limited kernel 58. At about 5,000 samples waveform 86 has a peak of about 620. Waveforms 88 of FIG. 8C represents the results of the subtraction between the waveforms 86 and 84. At about 5,000 samples, waveform 88 has a peak of about 320. Table 1 provides the peaks for the sample points of FIGS. 8A through 8C.

TABLE 1

| PT | FIG. 8B | FIG. 8A | FIG. 8C |
|---|---|---|---|
| 1 | 136.492 | 62.608 | 73.884 |
| 2 | 106.358 | 14.524 | 91.834 |
| 3 | 83.85 | 25.932 | 57.918 |
| 4 | 84.578 | 74.738 | 9.84 |
| 5 | 91.068 | 106.498 | □15.43 |
| 6 | 108.018 | 138.342 | □30.324 |
| 7 | 117.942 | 147.848 | □29.906 |
| 8 | 122.45 | 148.1 | □25.65 |
| 9 | 116.516 | 131.55 | □15.034 |
| 10 | 99.598 | 106.092 | □6.494 |
| 11 | 78.004 | 75.754 | 2.25 |
| 12 | 58.048 | 46.978 | 11.07 |
| 13 | 53.128 | 54.054 | □0.926 |
| 14 | 51.414 | 73.904 | □22.49 |
| 15 | 49.638 | 101.496 | □51.858 |
| 16 | 57.262 | 125.464 | □68.202 |
| 17 | 79.918 | 133.518 | □53.6 |
| 18 | 100.612 | 134.334 | □33.722 |
| 19 | 129.554 | 132.372 | □2.818 |
| 20 | 160.958 | 144.636 | 16.322 |
| 21 | 205.2 | 171.218 | 33.982 |
| 22 | 259.842 | 217.554 | 42.288 |
| 23 | 318.08 | 262.03 | 56.05 |
| 24 | 375.664 | 300.412 | 75.252 |
| 25 | 425.266 | 330.972 | 94.294 |
| 26 | 468.176 | 370.332 | 97.844 |
| 27 | 507.82 | 402.746 | 105.074 |
| 28 | 532.54 | 426.192 | 106.348 |
| 29 | 524.658 | 423.832 | 100.826 |
| 30 | 494.488 | 420.472 | 74.016 |
| 31 | 447.832 | 388.046 | 59.786 |
| 32 | 392.568 | 362.508 | 30.06 |
| 33 | 326.06 | 310.946 | 15.114 |
| 34 | 269.724 | 273.582 | □3.858 |
| 35 | 218.428 | 220.426 | □1.998 |
| 36 | 179.294 | 183.414 | □4.12 |
| 37 | 141.904 | 154.046 | □12.142 |
| 38 | 131.99 | 138.45 | □6.46 |
| 39 | 144.952 | 138.796 | 6.156 |
| 40 | 188.734 | 145.996 | 42.738 |
| 41 | 229.31 | 168.316 | 60.994 |
| 42 | 269.392 | 187.302 | 82.09 |
| 43 | 289.164 | 217.456 | 71.708 |
| 44 | 325.268 | 239.448 | 85.82 |

TABLE 1-continued

| PT | FIG. 8B | FIG. 8A | FIG. 8C |
|---|---|---|---|
| 45 | 381.24 | 269.982 | 111.258 |
| 46 | 470.97 | 291.62 | 179.35 |
| 47 | 556.04 | 311.638 | 244.402 |
| 48 | 632.662 | 320.672 | 311.99 |
| 49 | 666.37 | 327.886 | 338.484 |
| 50 | 682.912 | 316.566 | 366.346 |
| 51 | 645.342 | 300.838 | 344.504 |
| 52 | 578.464 | 244.936 | 333.528 |
| 53 | 488.72 | 200.322 | 288.398 |
| 54 | 406.364 | 181.106 | 225.258 |
| 55 | 355.598 | 214.392 | 141.206 |
| 56 | 335.812 | 257.71 | 78.102 |
| 57 | 331.302 | 304.892 | 26.41 |
| 58 | 320.084 | 328.564 | □8.48 |
| 59 | 295.804 | 344.556 | □48.752 |
| 60 | 244.326 | 325.484 | □81.158 |
| 61 | 201.814 | 309.774 | □107.96 |
| 62 | 159.432 | 273.418 | □113.986 |
| 63 | 131.212 | 252.814 | □121.602 |
| 64 | 110.39 | 211.528 | □101.138 |
| 65 | 102.73 | 187.156 | □84.426 |
| 66 | 102.816 | 149.414 | □46.598 |
| 67 | 110.306 | 131.21 | □20.904 |
| 68 | 111.544 | 103.266 | 8.278 |
| 69 | 112.654 | 88.172 | 24.482 |
| 70 | 104.274 | 66.428 | 37.846 |
| 71 | 95.028 | 51.164 | 43.864 |
| 72 | 83.14 | 44.216 | 38.924 |
| 73 | 67.332 | 35.466 | 31.866 |
| 74 | 54.146 | 49.894 | 4.252 |
| 75 | 44.032 | 61.438 | □17.406 |
| 76 | 47.314 | 79.8 | □32.486 |
| 77 | 48.14 | 90.57 | □42.43 |
| 78 | 46.05 | 90.92 | □44.87 |
| 79 | 50.212 | 89.642 | □39.43 |
| 80 | 53.948 | 87.474 | □33.526 |
| 81 | 69.542 | 98.87 | □29.328 |
| 82 | 90.604 | 114.71 | □24.106 |
| 83 | 119.372 | 137.21 | □17.838 |
| 84 | 140.134 | 155.052 | □14.918 |
| 85 | 163.708 | 174.508 | □10.8 |
| 86 | 170.788 | 185.888 | □15.1 |
| 87 | 179.99 | 201.078 | □21.088 |
| 88 | 168.26 | 209.176 | □40.916 |
| 89 | 167.938 | 222.132 | □54.194 |
| 90 | 162.268 | 239.844 | □77.576 |
| 91 | 164.434 | 270.3 | □105.866 |
| 92 | 176.192 | 304.134 | □127.942 |
| 93 | 186.756 | 335.824 | □149.068 |

Waveform 89 of FIG. 4D represents the hard limited kernel 78 from FIG. 6B. Waveform 87 of FIG. 4D represents the kernel 64 from FIG. 4G that occurs far away from the displacement signal in the record. The difference between waveforms 89 and 87 prove the effectiveness of hard limiting a signal.

Figure 9:
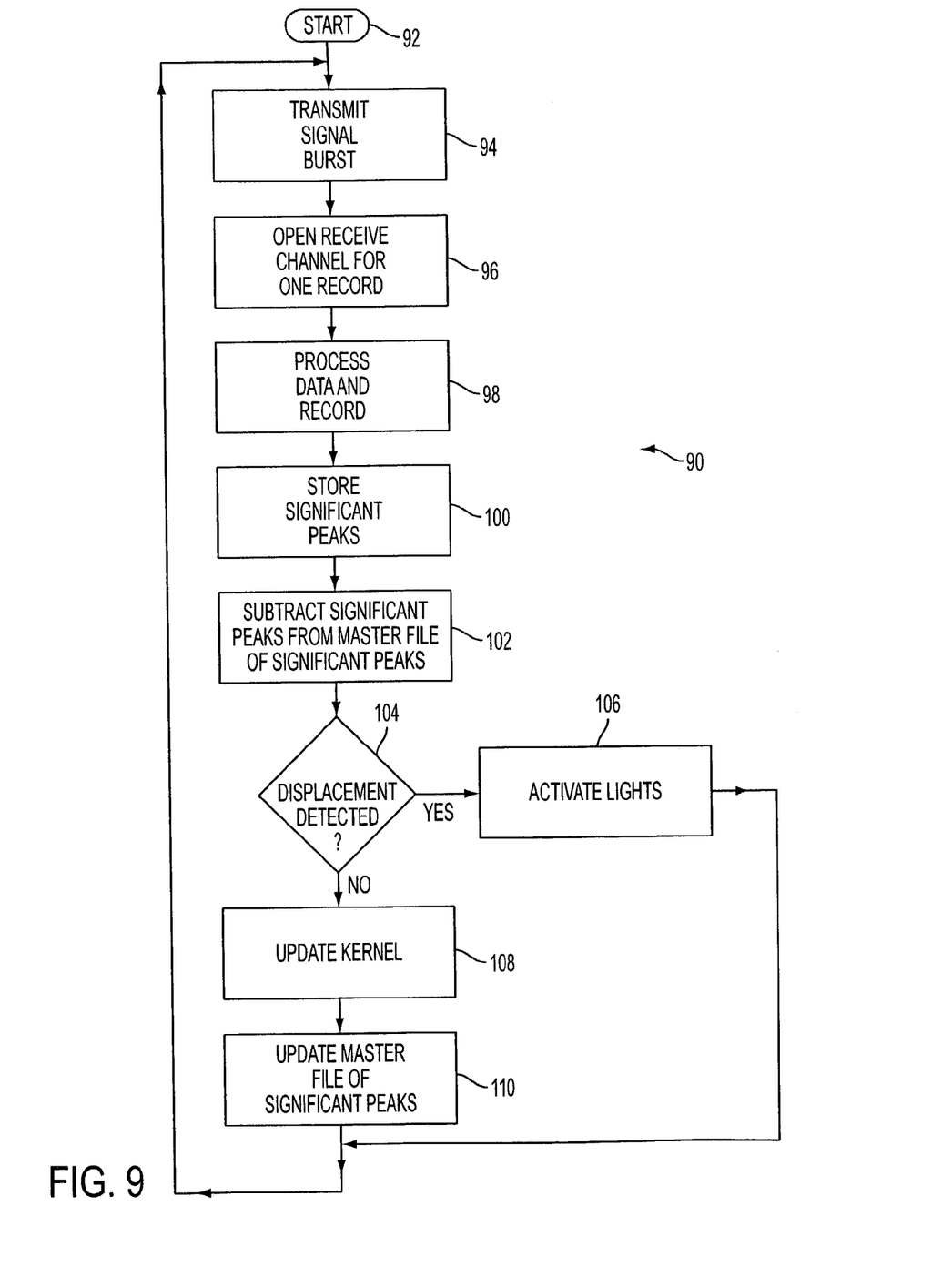
FIG. 9 is a flow chart of a method for using cross correlation to determine displacement of an object in accordance with an embodiment of the present invention.

FIG. 9 is a flow chart of a method for using cross correlation to determine displacement of an object in accordance with an embodiment of the present invention. The method 90 is intiated at step 92 and proceeds to step 94.

At step 94, a signal burst is transmitted in a room by transmitter 38. The signal burst is reflected off objects in the room. The reflected signals result in echoes which are received by receiver 36. The time period for substantially all the echoes to return from the initial signal burst comprises a record.

At step 98, the microcontroller 20 processes the record. In an embodiment of the invention, the term processing can represent using a cross-correlation detection technique. In a second embodiment of the invention, the term processing can represent using cross correlation with thinning as a detection technique. In a third embodiment of the invention, the term processing can represent using cross correlation with smoothing as a detection technique. In a fourth embodiment of the invention, the term processing can represent using a convolution detection technique. In each embodiment, a portion of an echo which comprises a kernel is retrieved from the record. The kernel is multiplied by the record.

At step 100, the values of significant peaks are stored in memory 28. The significant peaks represent movement in the room. The stored significant peaks, at step 102, are subtracted from a master file of significant peaks.

At step 104, a determination is made as to whether displacement was detected in the room. If displacement was detected, then the method proceeds to step 106 where the lights are activated in response to the detection of movement. If not, then the method proceeds to step 108 where the kernel is updated from a new record.

At step 110, the master file of significant peaks is updated with a new set of significant peaks. The method then returns to step 94.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and the following claims.

What is claimed is:

1. A load controller disposed between a load and a power source, comprising:
    a transmitter adapted to provide a pulsed signal within a monitored zone, said pulsed signal interacting with objects in said monitored zone and providing a return signal;
    a receiver adapted to receive and store echoes from said return signal of said pulsed signal; and
    a microcontroller circuit adapted to process said echoes by extracting a kernel from said return signal and multiplying said kernel by said stored return signal.

2. The load controller of claim 1, wherein said return signal comprises a record.

3. The load controller of claim 1, wherein said return signal comprises a plurality of samples.

4. The load controller of claim 1, wherein said kernel comprises a section of data for the plurality of samples for said return signal.

5. The load controller of claim 4, wherein said kernel includes significant peaks, said peaks being indicative of displacement in said monitored zone.

6. The load controller of claim 1, wherein said microcontroller stores successive return signals in memory with previously stored return signals.

7. The load controller of claim 1, wherein said microcontroller processes non-contiguous sample points at fixed intervals.

8. The load controller of claim 1, wherein said microcontroller processes at least one of said return signal and said kernel in real time.

9. The load controller of claim 1, wherein said microcontroller compares the return signal multiplied by the kernel to a second return signal multiplied by a second kernel.

10. The load controller of claim 1, wherein said load comprises at least one of a lighting system, an alarm system, and a heating and air conditioning (HVAC) system.

11. The load controller of claim 1, wherein said pulsed signal is approximately 1.5 ms in duration.

12. The load controller of claim 1, wherein said pulsed signal is transmitted in approximately 60 ms intervals.

13. The load controller of claim 1, wherein said transmitter comprises an ultrasonic transmitter.

14. The load controller of claim 1, wherein said monitored zone comprises a bounded area.

15. A method of detecting displacement for a monitored zone, comprising:
    transmitting a pulsed signal within said monitored zone;
    receiving a return signal comprising echoes associated with said transmitted pulsed signal, said return signal indicative of objects and displacement thereof within said monitored area;
    storing said return signal associated with said transmitted pulsed signal;
    retrieving a kernel from said return signal; and
    multiplying said kernel with said stored return signal.

16. The method of claim 15, wherein said kernel includes significant peaks, said peaks being indicative of displacement in said monitored zone.

17. The method of claim 15, further comprising:
    transmitting a second pulsed signal;
    receiving a second return signal from echoes associated with said second pulsed signal;
    storing said second return signal;
    retrieving a second kernel from said second return signal;
    multiplying said second kernel with said second return signal;
    comparing a result from said first multiplication to a result of said second multiplication; and
    activating a load indicative of whether said comparison exceeds a threshold value.

18. The method of claim 15, wherein said kernel is reversed in orientation.

19. The method of claim 15, further comprising at least one of
    storing fixed intervals of non-contiguous sample points for at least one of said kernel and said return signal; and
    storing successive return signals in memory with previously stored return signals.

20. The method of claim 15, wherein said transmit pulse is at least one of 1.5 ms in duration and transmitted in approximately 60 ms intervals.

* * * * *